United States Patent
Kerrod

(10) Patent No.: US 10,995,012 B2
(45) Date of Patent: May 4, 2021

(54) CONCENTRATED PHOTOACTIVE, NEUTRAL TITANIUM DIOXIDE SOL

(71) Applicant: Tronox LLC, Oklahoma City, OK (US)

(72) Inventor: Julie Kerrod, Ulceby (GB)

(73) Assignee: Tronox LLC, Oklahoma City, OK (US)

( * ) Notice: Subject to any disclaimer, the term of this patent is extended or adjusted under 35 U.S.C. 154(b) by 0 days.

(21) Appl. No.: 16/060,194

(22) PCT Filed: Dec. 9, 2016

(86) PCT No.: PCT/IB2016/057507
§ 371 (c)(1),
(2) Date: Jun. 7, 2018

(87) PCT Pub. No.: WO2017/098473
PCT Pub. Date: Jun. 15, 2017

(65) Prior Publication Data
US 2018/0370812 A1   Dec. 27, 2018

Related U.S. Application Data

(60) Provisional application No. 62/265,530, filed on Dec. 10, 2015.

(51) Int. Cl.
*B01J 21/06* (2006.01)
*C01G 23/053* (2006.01)
(Continued)

(52) U.S. Cl.
CPC ..... *C01G 23/0532* (2013.01); *B01D 53/8628* (2013.01); *B01D 53/8668* (2013.01);
(Continued)

(58) Field of Classification Search
CPC .......... B01D 2255/20707; B01J 21/063; B01J 35/0013
See application file for complete search history.

(56) References Cited

U.S. PATENT DOCUMENTS 6,626,987 B1 * 9/2003 Suzuki ................ B01J 13/0008
106/287.14
7,820,724 B2 * 10/2010 Fu ....................... B01F 17/0007
516/90

(Continued)

FOREIGN PATENT DOCUMENTS

JP    2001029795 A    2/2001
JP    2007320839 A    12/2007
(Continued)

OTHER PUBLICATIONS

"Water Conductivity". No Author, no date. Retrieved from https://www.lenntech.com/applications/ultrapure/conductivity/water-conductivity.htm on Jun. 4, 2019.*

(Continued)

*Primary Examiner* — Michael A Salvitti
(74) *Attorney, Agent, or Firm* — McAfee & Taft

(57) ABSTRACT

The present disclosure relates to methods of preparing sols of titanium dioxide nanoparticles that are photoactive, neutral, and in a substantially concentrated form. The methods particularly provide for concentrated sols in light of washing and dewatering under low cation concentrations and utilizing rapid peptizing through addition of the filter case to the peptizing agent. Concentrated acid may be utilized to maintain high $TiO_2$ concentration while still avoiding precipitation of the colloidal $TiO_2$. Concentrated photoactive, neutral titanium dioxide sols are also provided as well as compositions thereof and photoactive coatings formed therewith.

24 Claims, 3 Drawing Sheets

(51) Int. Cl.
  *B01J 37/03* (2006.01)
  *B01J 13/00* (2006.01)
  *B01J 35/00* (2006.01)
  *B01D 53/86* (2006.01)
  *B82Y 30/00* (2011.01)

(52) U.S. Cl.
  CPC ......... *B01J 13/0047* (2013.01); *B01J 21/063* (2013.01); *B01J 35/004* (2013.01); *B01J 35/0013* (2013.01); *B01J 37/036* (2013.01); *B01D 2255/20707* (2013.01); *B01D 2255/802* (2013.01); *B01D 2257/404* (2013.01); *B01D 2257/708* (2013.01); *B01D 2258/06* (2013.01); *B82Y 30/00* (2013.01); *C01P 2002/30* (2013.01); *C01P 2004/64* (2013.01); *C01P 2006/22* (2013.01)

(56) References Cited

U.S. PATENT DOCUMENTS 9,352,299 B2 * 5/2016 Kerrod ................... B01J 21/063
2009/0022646 A1 * 1/2009 Trabzuni ............... C01B 33/193
  423/333
2009/0209665 A1 * 8/2009 Fu ....................... B01F 17/0007
  516/90
2013/0122074 A1 * 5/2013 Kerrod ................... B01J 21/063
  424/411
2018/0370812 A1 * 12/2018 Kerrod ............... B01D 53/8668

FOREIGN PATENT DOCUMENTS

| | | |
|---|---|---|
| JP | 2008142655 A | 6/2008 |
| JP | 2015502250 A | 1/2015 |
| JP | 2015044738 A | 3/2015 |

OTHER PUBLICATIONS

Japanese Office Action dated Nov. 20, 2018; Japanese Patent Application No. 2018-548430.
Hongfa, Zhu, Catalyst Support, Apr. 30, 1980, pp. 1-4.
Chinese Office Action received in corresponding application No. 201680072267.9, dated Aug. 5, 2020; pp. 1-13.

* cited by examiner

CONCENTRATED PHOTOACTIVE, NEUTRAL TITANIUM DIOXIDE SOL

CROSS-REFERENCE TO RELATED APPLICATIONS

The present application is a U.S. National Stage of International Patent Application PCT/IB2016/057507, filed Dec. 9, 2016 and claims priority to U.S. Provisional Patent Application No. 62/265,530 filed Dec. 10, 2015. The disclosures of each of the applications noted above are incorporated herein by reference in their entirety.

FIELD OF THE INVENTION

The present invention relates to sols of titanium dioxide nanoparticles that are photoactive, neutral, and in a substantially concentrated form.

BACKGROUND OF THE INVENTION

Titanium dioxide ($TiO_2$) sols are useful in forming substantially transparent or translucent coatings that are beneficial in removing pollutants, such as nitrogen oxides (i.e., NOx) and volatile organic compounds (VOCs), from air. Such capabilities are known to arise from the photocatalytic properties of the nanoparticulate titanium dioxide wherein application of ultraviolet (UV) radiation and near-UV radiation promotes formation of radicals that can degrade (e.g., oxidize) NOx and VOCs. Such coatings are also beneficially self-cleaning since many soiling materials (e.g., grease, mildew, mold, algae, bacteria, etc.) are also oxidized on the coating surface due to the photoactivity of the titanium dioxide nanoparticles in the coating.

It is beneficial to provide photoactive titanium dioxide coatings in a neutral pH, which can be substantially odorless and non-flammable. Such neutral sols can be applied as environmentally friendly photoactive water-based surface coatings.

Presently available photoactive, neutral titanium dioxide sols provide the foregoing uses but are limited due to the substantially low titanium dioxide concentration in the colloidal solution. Because of the inherent difficulty in forming a neutral titanium dioxide sol, such known materials are limited in concentration to the range of about 10-15% by weight titanium dioxide nanoparticles. While such low concentration sols are effective in providing the desired activities, the low concentration inherently requires the presence of a substantially large volume of solvent.

The inherently high solvent concentration can lead to various difficulties in the use of photoactive, neutral titanium dioxide sols. For example, if used as an additive in other coating materials, the addition of the titanium dioxide can also add a substantially large and undesired volume of solvent to the other coating material. Additionally, because approximately 90% by weight of the typical photoactive, neutral titanium dioxide sol consists of solvent, transportation of the titanium dioxide sol includes excessive space and cost requirements that could be minimized if the titanium dioxide sol could be provided in a more concentrated form. Moreover, a photoactive, neutral titanium dioxide sol with a greater concentration could find expanded uses in light of simplified storage and transportation and the ability to dilute the sol at the time of use as needed to provide desired formulations, particularly in admixture with further coating materials. Accordingly, there remains a need in the field for methods of forming photoactive, neutral titanium dioxide sols in a highly concentrated form and the compositions formed by such methods.

SUMMARY OF THE INVENTION

The present disclosure provides photoactive, neutral titanium dioxide sols in a beneficially concentrated form as well as methods of preparing such concentrated titanium dioxide sols. Although photoactive, neural titanium dioxide sols have been previously described in the art, such sols have been limited in the concentration that may be achieved. The present disclosure provides methods that are useful for forming the photoactive, neutral titanium dioxide sols in a concentrated form, as well as compositions formed using such sols.

In some embodiments, the present disclosure can relate to methods for preparing a photocatalytic, neutral titanium dioxide sol. For example, such methods can comprise: washing and dewatering a hydrous titanium dioxide gel with an aqueous solvent having a cation concentration of about 500 ppm or less until achieving a filtrate conductivity of about 750 μS/cm or less and forming a titanium dioxide filter cake; peptizing the titanium dioxide filter cake by adding the filter cake to an alkaline peptizing agent to provide a peptized alkaline titanium dioxide sol with a $TiO_2$ concentration of about 30% by weight or greater; and neutralizing the peptized alkaline titanium dioxide sol with a concentrated acid to provide a photocatalytic, neutral titanium dioxide sol with a pH of about 7 to about 9 and a $TiO_2$ concentration of about 30% by weight or greater. In further embodiments, the methods of the present disclosure may be further defined in relation to any one or more of the following statements in any combination.

The washing and dewatering can comprise processing the hydrous titanium dioxide gel in a filter press.

The aqueous solvent can be demineralized water.

The aqueous solvent can have a cation concentration of about 100 ppm or less.

The aqueous solvent can have a $Ca^{2+}$ concentration of about 50 ppm or less.

The washing and dewatering can be carried out until achieving a filtrate conductivity of about 600 μS/cm or less.

The alkaline peptizing agent can be selected from the group consisting of an alkylamine, a quaternary ammonium hydroxide, and combinations thereof.

The alkaline peptizing agent can be selected from the group consisting of diethylamine (DEA), tetraethyl ammonium hydroxide (TEAOH), and combinations thereof.

The titanium dioxide filter cake can be added to the peptizing agent under mixing.

The peptizing can be substantially completed in a time of about 90 minutes or less.

The peptized alkaline titanium dioxide sol can have a $TiO_2$ concentration of about 40% by weight or greater.

The peptized alkaline titanium dioxide sol can have a pH of about 11 or greater.

The concentrated acid can comprise phosphoric acid.

The phosphoric acid can have a concentration of about 75% w/w or greater.

The neutralizing can be carried out in a time of about 120 minutes or less.

The neutral titanium dioxide sol can have a pH of about 8 to about 9 and a $TiO_2$ concentration of about 35% by weight or greater.

The $TiO_2$ particles in the neutral titanium dioxide sol can have an average size of about 50 nm or less.

About 90% or greater of the $TiO_2$ particles in the neutral titanium dioxide sol can be in the anatase form.

The neutral titanium dioxide sol can have a viscosity of about 40 centipoise to about 100 centipoise.

In some embodiments, a method for preparing a photocatalytic, neutral titanium dioxide sol particularly can comprise: processing a hydrous titanium dioxide gel in a filter press with demineralized water having a $Ca^{2+}$ concentration of about 50 ppm or less until achieving a filtrate conductivity of about 500 µS/cm or less and forming a titanium dioxide filter cake; peptizing the titanium dioxide filter cake by adding the filter cake to an alkaline peptizing agent with mixing to provide a peptized alkaline titanium dioxide sol with a $TiO_2$ concentration of about 30% by weight or greater, said peptizing being substantially completed in a time of about 60 minutes or less; and neutralizing the peptized alkaline titanium dioxide sol with phosphoric acid at a concentration of about 85% w/w or greater to provide a photocatalytic, neutral titanium dioxide sol with a pH of about 8 to about 9 and a $TiO_2$ concentration of about 35% by weight or greater.

The invention includes, without limitation, the following embodiments.

Embodiment 1: A method for preparing a photocatalytic, neutral titanium dioxide sol, the method comprising: washing and dewatering a hydrous titanium dioxide gel with an aqueous solvent having a cation concentration of about 500 ppm or less until achieving a filtrate conductivity of about 750 µS/cm or less and forming a titanium dioxide filter cake; peptizing the titanium dioxide filter cake by adding the filter cake to an alkaline peptizing agent to provide a peptized alkaline titanium dioxide sol with a $TiO_2$ concentration of about 30% by weight or greater; and neutralizing the peptized alkaline titanium dioxide sol with a concentrated acid to provide a photocatalytic, neutral titanium dioxide sol with a pH of about 7 to about 9 and a $TiO_2$ concentration of about 30% by weight or greater.

Embodiment 2: The method according to any previous or subsequent embodiment, wherein the washing and dewatering comprises processing the hydrous titanium dioxide gel in a filter press.

Embodiment 3: The method according to any previous or subsequent embodiment, wherein the aqueous solvent is demineralized water.

Embodiment 4: The method according to any previous or subsequent embodiment, wherein the aqueous solvent has a cation concentration of about 100 ppm or less.

Embodiment 5: The method according to any previous or subsequent embodiment, wherein the aqueous solvent has a $Ca^{2+}$ concentration of about 50 ppm or less.

Embodiment 6: The method according to any previous or subsequent embodiment, wherein the washing and dewatering is carried out until achieving a filtrate conductivity of about 600 µS/cm or less.

Embodiment 7: The method according to any previous or subsequent embodiment, wherein the alkaline peptizing agent is selected from the group consisting of an alkylamine, a quaternary ammonium hydroxide, and combinations thereof.

Embodiment 8: The method according to any previous or subsequent embodiment, wherein the alkaline peptizing agent is selected from the group consisting of diethylamine (DEA), tetraethyl ammonium hydroxide (TEAOH), and combinations thereof.

Embodiment 9: The method according to any previous or subsequent embodiment, wherein the titanium dioxide filter cake is added under mixing.

Embodiment 10: The method according to any previous or subsequent embodiment, wherein peptizing is substantially completed in a time of about 90 minutes or less.

Embodiment 11: The method according to any previous or subsequent embodiment, wherein the peptized alkaline titanium dioxide sol has a $TiO_2$ concentration of about 40% by weight or greater.

Embodiment 12: The method according to any previous or subsequent embodiment, wherein the peptized alkaline titanium dioxide sol has a pH of about 11 or greater.

Embodiment 13: The method according to any previous or subsequent embodiment, wherein the concentrated acid comprises phosphoric acid.

Embodiment 14: The method according to any previous or subsequent embodiment, wherein the phosphoric acid has a concentration of about 75% w/w or greater.

Embodiment 15: The method according to any previous or subsequent embodiment, wherein the neutralizing is carried out in a time of about 120 minutes or less.

Embodiment 16: The method according to any previous or subsequent embodiment, wherein the neutral titanium dioxide sol has a pH of about 8 to about 9 and a $TiO_2$ concentration of about 35% by weight or greater.

Embodiment 17: The method according to any previous or subsequent embodiment, wherein the $TiO_2$ particles in the neutral titanium dioxide sol have an average size of about 50 nm or less.

Embodiment 18: The method according to any previous or subsequent embodiment, wherein about 90% or greater of the $TiO_2$ particles in the neutral titanium dioxide sol are in the anatase form.

Embodiment 19: The method according to any previous or subsequent embodiment, wherein the neutral titanium dioxide sol has a viscosity of about 40 centipoise to about 100 centipoise.

Embodiment 20: A method for preparing a photocatalytic, neutral titanium dioxide sol, the method comprising:

processing a hydrous titanium dioxide gel in a filter press with demineralized water having a $Ca^{2+}$ concentration of about 50 ppm or less until achieving a filtrate conductivity of about 500 µS/cm or less and forming a titanium dioxide filter cake;

peptizing the titanium dioxide filter cake by adding the filter cake to an alkaline peptizing agent with mixing to provide a peptized alkaline titanium dioxide sol with a $TiO_2$ concentration of about 30% by weight or greater, said peptizing being substantially completed in a time of about 60 minutes or less;

neutralizing the peptized alkaline titanium dioxide sol with phosphoric acid at a concentration of about 85% w/w or greater to provide a photocatalytic, neutral titanium dioxide sol with a pH of about 8 to about 9 and a $TiO_2$ concentration of about 35% by weight or greater.

Embodiment 21: A photocatalytic, neutral titanium dioxide sol prepared according to a method of any previous embodiment.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

In order to provide an understanding of embodiments of the disclosure, reference is made to the appended drawings, which are not necessarily drawn to scale, which are exemplary only, and should not be construed as limiting the disclosure, and wherein.

DETAILED DESCRIPTION OF THE INVENTION

Figure 1:
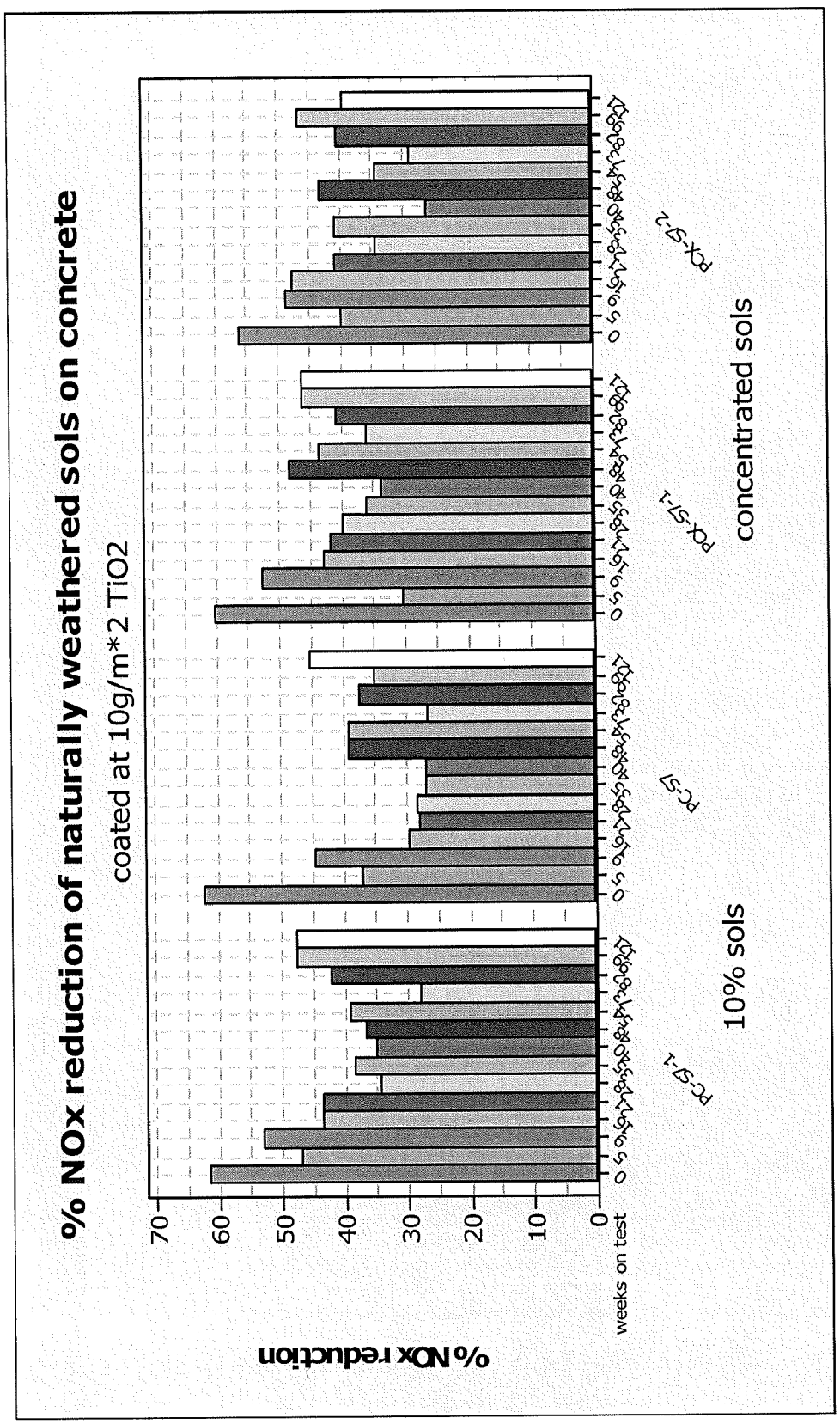
FIG. 1 is a graph showing NOx reduction of comparative formulations against formulations prepared according to embodiments of the present disclosure.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present disclosure provides for formation of sols of titanium dioxide nanoparticles that are photoactive, neutral, and in a substantially concentrated form. As used herein, the term "sol" can refer to a colloidal suspension of particles. A titanium dioxide sol, in particular, can refer to a suspension of $TiO_2$ particles in a solvent.

The photoactive, neutral titanium dioxide sols disclosed herein particularly can be adapted to remove nitrogen oxides (NOx) from the air. As used herein, the term "NOx" can refer to NO, $NO_2$, or the sum of nitrogen oxide species (including NO and $NO_2$) present in a sample (or in air generally). The present disclosure further provides methods of removing NOx and/or VOCs and/or other pollutants by providing coatings or layers of the photoactive, neutral titanium dioxide sols in locations where such materials may be present.

In some embodiments, the present disclosure provides a method for preparing a photocatalytic, neutral titanium dioxide sol. The method can comprise, for example washing and dewatering a hydrous titanium dioxide gel with an aqueous solvent to form a titanium dioxide filter cake; peptizing the titanium dioxide filter cake by adding the filter cake to an alkaline peptizing agent to provide a peptized alkaline titanium dioxide sol with a $TiO_2$ concentration of about 30% by weight or greater; and neutralizing the peptized alkaline titanium dioxide sol with a concentrated acid to provide a photocatalytic, neutral titanium dioxide sol with a $TiO_2$ concentration of about 30% by weight or greater. Specific aspects of the methods are more fully described below. Additionally, the methods may be supplemented by the methods described in U.S. Pat. Pub. No. 2013/0122074 to Kerrod et al., the disclosure of which is incorporated herein by reference.

Whereas previous methods of preparing a titanium dioxide sol have typically consisted of decantation, the methods of the present disclosure can provide for increasing the concentration of the material at least in part through utilization of washing and dewatering steps as described herein. The hydrous titanium dioxide gel can be obtained via neutralization of titanium sulfate salts, such as formed in typical sulfuric acid mineral processing. For example, a sulfate gel can be neutralized with ammonium hydroxide to provide the neutralized titanium dioxide gel.

By utilizing a washing and dewatering process as described herein, it is possible to increase the $TiO_2$ concentration in the material to be subjected to peptizing. In some embodiments, washing and dewatering can be carried out utilizing a filter press. In such methods, the hydrous titanium dioxide gel is pumped into a filter press unit wherein the titanium dioxide solids collect on the filter webs. The increasing pressure on the filter webs as the solids are collected is beneficial to force non-solids through the web and into the filtrate, thus increasing the $TiO_2$ concentration in the filter cake(s) formed on the webs. If desired, air may be forced through the filter cakes to further remove the non-solids and increase $TiO_2$ concentration. Any type of filter press may be utilized, such as PF series Outotec LAROX® filter press.

The filter cakes with the $TiO_2$ solids can be washed by pumping of an aqueous solvent through the filter cakes on the webs. The aqueous solvent, in some embodiments, can be demineralized water. Preferably, the aqueous solvent has a low concentration of interfering ions that may cause agglomeration and instability of the resulting titanium dioxide sol. Interfering ions particularly may be cations, and more particularly divalent cations. In some embodiments, the aqueous solvent can have a cation concentration of about 100 ppm or less, about 75 ppm or less, or about 50 ppm or less. The presence of $Ca^{2+}$ particularly may be beneficial. In some embodiments, the aqueous solvent can have a $Ca^{2+}$ concentration of about 75 ppm or less, about 50 ppm or less, or about 25 ppm or less. Demineralized water particularly can be useful in meeting such requirements. By contrast, tap water often may contain $Ca^{2+}$ concentrations in excess of 2,500 ppm.

In some embodiments, washing can be carried out until the filtrate has a desired conductivity. Any recognized method for measuring filtrate conductivity can be utilized according to the present disclosure such as, for example, the methods described in ASTM D1125-14, Standard Test Methods for Electrical Conductivity and Resistivity of Water. In particular embodiments, a Model 470 Portable Conductivity/TDS Meter can be used and can be calibrated against a 0.01M potassium chloride standard solution. Washing preferably can be carried out until the filtrate has a measured conductivity of about 700 μS/cm or less, about 600 μS/cm or less, or about 500 μS/cm or less. The wash ratio (i.e., ratio of the wash water volume to the volume of the cake liquor prior to washing) can be in the range of about 1:1 to about 20:1, about 5:1 to about 15:1, or about 9:1 to about 13:1. The total time of washing can range from about 0.5 hrs to about 3 hrs or about 1 hrs to about 2 hrs. Preferably, the filter cake after washing comprises about 40% or greater by weight or about 45% or greater by weight $TiO_2$ based on the total weight of the filter cake. The $TiO_2$ and remaining water in the filter cake preferably account for about 95% or greater, about 98% or greater, or about 99% or greater by weight of the filter cake.

Peptizing of the titanium dioxide filter cake is preferably carried out by adding the filter cake to an alkaline peptizing agent. The order of addition can be particularly important for ensuring rapid and substantially complete peptization of the filter cake. If the peptizing agent is added to the filter cake, it has been found that a semi-fluid slurry is formed, and peptization proceeds poorly or there is substantially no peptization that occurs. On the contrary, by adding the filter cake to the peptizing agent, it has been found the peptization occurs very favorably. Preferably, the filter cake is added to the peptizing agent with mixing, such as utilization of a paddle mixer. Under such conditions, as peptization occurs, the filter cake rapidly changes from being relatively solid to being a relatively thin liquid. In some embodiments, peptization can be completed in a time of about 2 hrs or less, about 1.5 hrs or less, or about 1 hr or less.

A variety of peptizing agents can be used according to the present disclosure. For example, in some embodiments, the alkaline peptizing agent can be selected from the following groups: mono-, di-, and trialkyl amines; mono-, di-, and triarylamines; organic bases with two or more functional groups (e.g., dialkanolamines and trialkanolamines). The mono-, di-, and trialkylamine peptizing agents may comprise linear, branched, or cyclic alkyl groups. In particular, exemplary amines can include, but are not limited to, mono-, di-, or trimethyl amines; mono-, di-, or triethylamine; mono-, di-, or tripropylamine; mono-, di-, or tributyl amine, sec-butylamine, isobutylamine, isopropylamine, isoamylamine, tert-amylamine, 2-methylbutylamine, 1-methylbutylamine, and combinations thereof like. In one embodiment the alkaline peptizing agent can be diethylamine (DEA).

Non-limiting examples of amines with cyclic alkyl groups that may be used according to the present disclosure include cyclopropylamine, cyclobutylamine, cyclopentylamine, cyclohexylamine, cycloheptylamine, and cyclooctylamine, as well as their di- and tri-alkyl derivatives Amines with different alkyl groups, such as diisopropylethylamine, ethylbutylamine, methylethylamine, and the like, may also be used. Also encompassed by the present disclosure are cyclic amines, such as pyrrolidine, piperidine, morpholine, and the like, as well as their N-alkyl derivatives. In some embodiments, tert-butylamine, triethylamine, propylamine, dipropylamine, diisopropylethylamine, and the like may be used as alkaline peptizing agents.

In another embodiment, the alkaline peptizing agent can be a quaternary ammonium hydroxide. In some embodiments, the quaternary ammonium hydroxide may be selected from the group consisting of tetraalkylammonium hydroxide where the alkyl contains one of $C_1$ through $C_{10}$ atoms or combinations of $C_1$ through $C_{10}$ atoms. The quaternary ammonium hydroxide can be, for example, tetraethylammonium hydroxide (TEAOH).

The concentration of the peptizing agent can vary depending upon the exact material used. In some embodiments, the peptizing agent can be used in a concentration of about 5% by weight to about 25% by weight. For example, DEA may be used at a concentration of about 10% by weight to about 20% by weight (e.g., about 15% by weight), and TEAOH may be used at a concentration of about 5% to about 15% by weight (e.g., about 10% by weight), based on the weight of $TiO_2$ present in the filter cake.

The peptized titanium dioxide sol can have a $TiO_2$ concentration of about 30% by weight or greater, about 35% by weight or greater, or about 40% by weight or greater. The pH of the peptized titanium dioxide sol can be in the range of about 11 to about 13 (e.g., about 12).

The peptized alkaline titanium dioxide sol can be neutralized with a suitable acid composition to bring the pH of the titanium dioxide sol into the range of about 7 to about 9 or about 7.5 to about 8.5. Neutralizing can be carried out using a single acid or a combination of multiple acids. For example, mineral acids and/or organic acids can be used.

Preferably, a concentrated acid is utilized. The use of a concentrated acid can be particularly beneficial to maintain the high $TiO_2$ concentration in the sol. For example, 85% phosphoric acid can be used in some embodiments. Other strong acids, however, may also be used. Preferably, a concentrated acid has an acid content of at least 75% by weight, at least 80% by weight, or at least 85% by weight. The concentrated acid can be added to the peptized titanium dioxide sol such that there is substantially no precipitation of the colloidal $TiO_2$. In particular, the concentrated acid can be added at a controlled rate that is effective to substantially prevent precipitation. In one or more embodiments, the concentrated acid can be added at a rate that is about 5% or less per minute, about 2% or less per minute, about 1% or less per minute, or about 0.5% or less per minute. In each instance, the lower end of the addition rate can be at least 0.01% per minute. More particularly, the addition rate can be about 0.02% per minute to about 5% per minute, about 0.05% per minute to about 2% per minute, about 0.08% per minute to about 1% per minute, or about 0.1% per minute to about 0.5% per minute. The percentage can be based on the total mass of the sol being neutralized. The mass ratio of concentrated acid to the sol being neutralized can be about 1:2 to about 2:1 or about 1:1. The neutralization process can be carried out in a time of about 120 minutes or less or about 90 minutes or less.

The neutralized titanium dioxide sol can have an initial pH on the low end of the noted range above—e.g., about 7.25. The pH of the titanium dioxide sol can increase over the course of about 10 days before stabilizing within the range noted above, particularly in the range of about 7.5 to about 8.5.

The neutral titanium dioxide sol can have a $TiO_2$ concentration of about 35% by weight or greater or about 40% by weight or greater based on the total weight of the sol. The $TiO_2$ particles in the titanium dioxide sol can have an average particle size that is less than about 100 nm, less than about 50 nm, less than about 25 nm, or less than about 10 nm (e.g., about 1 nm to about 50 nm, about 1 nm to about 40 nm, or about 2 nm to about 20 nm). Surface area preferably can be at least about 50 $m^2/g$, at least about 100 $m^2/g$, at least about 200 $m^2/g$, or at least about 250 $m^2/g$ (e.g., about 50 $m^2/g$ to about 500 $m^2/g$, about 100 $m^2/g$ to about 450 $m^2/g$, or about 150 $m^2/g$ to about 400 $m^2/g$). Crystalline structure preferably can be the anatase form; however, a portion of the particles can be in the rutile form. Particle characterization can be carried out using known techniques, such as transmission electron microscopy (TEM), X-ray diffraction spectroscopy (XRD), or light scattering techniques (such as dynamic light scattering, by Malvern Instruments Ltd., U.K.).

The photocatalytic, neutral titanium dioxide sol can include an aqueous solvent, particularly water, which may be used alone or combined with a water-miscible solvent, such as an alcohol. The titanium dioxide sol may optionally include additional ingredients provided that the addition of such ingredients does not have a measurable negative impact on either the transparency or stability of the sol. Non-limiting examples of further materials that may be present in addition to $TiO_2$ and solvent can include bactericidal agents, organic solvents (e.g. alcohols), film-forming aids, sequestering agents, and pH adjusters.

The titanium dioxide sol can be utilized in forming a coating layer over a substrate, which coating layer may be particularly useful in removal of NOx, VOCs, or other materials from its surroundings. The coating layer can provide a requisite level of transparency or translucency that provides the requisite photocatalytic capability. Transparency can be characterized in relation to the amount of visible light (i.e., in the wavelength range of about 400 nm to about 700 nm) that passes through the layer. Preferably, transparency is such that at least about 50%, at least about 60%, at least about 70%, at least about 80%, or at least about 90% (e.g., about 50% to about 99%, about 60% to about 98%, or about 65% to about 95%) of light in the visible spectrum that is incident to the layer passes therethrough.

A coating layer of the photocatalytic, neutral titanium dioxide sol according to the present disclosure can be effective for removal of NOx from air. For example, the coating layer can provide for NOx reduction of at least about 25%, at least about 30%, at least about 40%, or at least about 50% by weight. The NOx reduction may be characterized over a specified duration. For example, a coating of a photocatalytic, neutral titanium dioxide sol according to the present disclosure can provide for at least about 30% by weight NOx reduction for a time of at least about 4 weeks, at least about 10 weeks, at least about 20 weeks, at least about 50 weeks, or at least about 100 weeks. In some embodiments, such coating can exhibit at least about 40% NOx reduction after a time of at least about 20 weeks, at least about 50 weeks, or at least about 100 weeks measured from the time of formation of the coating layer. Such duration can be based upon the coating layer being subjected to natural weathering (i.e., outside, ambient conditions) for the duration of the testing. The coating layers can be provided, for example, at a distribution of 10 $g/m^2$ on a concrete substrate.

The photocatalytic, neutral titanium dioxide sol according to the present disclosure can exhibit excellent stability, which stability can be characterized in relation to sol viscosity. Instability within a colloid sol can be detected by changes in viscosity. In particular, large increases in viscosity, or even gelling of the material, can indicate that agglomeration of unstable particles is occurring. Although viscosity can vary slightly based upon surrounding temperature, a titanium dioxide sol according to the present disclosure can have a viscosity of about 40 centipoise to about 100 centipoise, about 45 centipoise to about 95 centipoise, or about 50 centipoise to about 90 centipoise. Stability can be characterized in that, after storage under ambient (room temperature) conditions for a time of at least about 4 weeks, at least about 10 weeks, at least about 20 weeks, at least about 50 weeks, or at least about 90 weeks, the viscosity of the sol increases by no more than about 20 centipoise. In some embodiments, after the same storage conditions and times, the viscosity of the sol may be no greater than 100 centipoise or no greater than 90 centipoise. Such viscosity readings may apply, for example, to a sol comprising about 37% by weight $TiO_2$ and having an average $TiO_2$ particle size of about 40 nm.

Experimental

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

EXAMPLE 1

Percent NOx Reduction

Testing was carried out to confirm that a diluted concentrated sol prepared according to the present disclosure provided NOx reduction that was comparative to the NOx reduction provided by a sol that was originally formed with an approximate 10% $TiO_2$ concentration. Testing confirmed that first forming a concentrated sol and then diluting to a 10% $TiO_2$ concentration did not substantially reduce NOx reduction capability compared to a sol pre-formed with a 10% $TiO_2$ concentration.

A formulation was prepared according to the present disclosure so as to be a neutral $TiO_2$ sol with a $TiO_2$ concentration of approximately 35% by weight based on the total weight of the sol. The concentrated formulation was diluted with deionized water to a $TiO_2$ concentration of approximately 10% by weight based on the total weight of the sol. The diluted formulation was tested against CristalACTiV™ PCS7 transparent $TiO_2$ sol (10 wt %), available from Cristal.

Using an air brush, each sol was sprayed onto a concrete panel measuring 120 mm by 15 mm so as to give a $TiO_2$ coating weight of 10 $g/m^2$. This was carried out in duplicate for each sol. The duplicate samples of the diluted concentrate according to the present disclosure were labeled PCX-S7-1 and PCX-S7-2, and the comparative duplicate samples were labeled PC-S7 and PC-S7-1. After drying, initial NOx reduction readings were taken for each sample.

For the present testing, after the initial readings were taken, the samples were aged outdoors with natural weathering, and follow-up readings were obtained after 5, 9, 16, 21, 28, 35, 40, 46, 54, 73, 82, 99, and 121 weeks. For the evaluations, the samples were placed in a NOx analyzer under a flow of NO, and readings were taken under applied light. A NOx analyzer, such as an EnviroTech NOx Analyzer model T200, can be used. Further NOx analyzers are commercially available, such as from Teledyne Technologies Incorporated, Altech Environment USA, and Emerson Process Management. The NOx analyzer consists of a sealed test chamber (e.g., a quartz tube), a light source configured for illuminating the test chamber, a source of NO gas, tubing for delivery of the NO gas to the test chamber, an analyzer configured for detecting the presence of NOx, tubing for delivery of gas from the test chamber to the analyzer, a purified air (NOx-free) source, tubing for delivery of purified air to the test chamber, an optional humidifier for delivery of water vapor to the test chamber, valves, and pumps. At least the test chamber is in a light-proof container to enable "dark" readings. For each test, NOx concentration readings were taken without the applied light and then again with the applied light to evaluate the reduction of NOx under the photocatalytic conditions. Test results are shown in TABLE 1 below and are illustrated in FIG. 1.

TABLE 1

| | % NOx reduction | | | |
|---|---|---|---|---|
| Weeks on test | PCX-S7-1 (conc. sol) | PC-S7-1 (10% sol) | PCX-S7-2 (conc. sol) | PC-S7 (10% sol) |
| 0 | 60.3 | 61.8 | 56.3 | 62.4 |
| 5 | 30.3 | 47.1 | 39.8 | 37.2 |
| 9 | 52.9 | 53.1 | 48.8 | 44.6 |
| 16 | 43.0 | 43.8 | 47.7 | 29.8 |
| 21 | 41.8 | 43.5 | 40.9 | 27.8 |
| 28 | 39.7 | 34.6 | 34.6 | 28.3 |
| 35 | 36.2 | 38.5 | 40.9 | 26.8 |
| 40 | 33.8 | 35.0 | 26.2 | 26.9 |
| 48 | 48.4 | 36.9 | 43.4 | 39.3 |
| 54 | 43.8 | 39.2 | 34.3 | 39.2 |
| 73 | 36.0 | 28.1 | 29.0 | 26.5 |
| 82 | 41.1 | 42.3 | 40.6 | 37.4 |
| 99 | 46.3 | 47.6 | 46.7 | 35.2 |
| 121 | 46.3 | 47.7 | 39.7 | 45.5 |
| Cumulative total | 599.8 | 599.3 | 568.8 | 506.9 |

As seen in TABLE 1 and FIG. 1, the formulations prepared by diluting a concentrated sol according to the present disclosure exhibited NOx reduction that was substantially the same as the sol that was pre-formed at the lower concentration [difference in % NOx reduction between PCX-S7-1 (cumulative total of 599.8) and PC-S7-1 (cumulative total of 599.3) was 0.083%] or exhibited an increased cumulative reduction [increase of 12.2% for PCX-S7-2 (cumulative total of 568.8) relative to PC-S7 (cumulative total of 506.9)]1.

The presence of any increase in NOx reduction was surprising since the sols tested in relation to TABLE 1 and FIG. 1 had the same concentration during the testing phase. As such, it has been shown that the concentrated sol could be formed and then diluted and still produce the same or better results in NOx reduction compared to the conventional diluted sol. In addition to being environmentally friendly with respect to NOx reduction, the invention also contributes to sustainability in that less solvent (e.g. water) is needed to create and store the sol, i.e. the extra water needed to form the diluted sol can be repurposed until such time the diluted sol is needed by the user.

EXAMPLE 2

Transparency

Testing was carried out to confirm that a diluted concentrated sol prepared according to the present disclosure provided a level of transparency that was comparative to the transparency of a sol that was originally formed with an approximate 10% $TiO_2$ concentration. The inventive formulations and the comparative formulations from Example 1 were used.

The sols were drawn down on a 50 mm by 100 mm clean glass panel using a 50 micron draw down bar. The sols were allowed to dry under ambient conditions for 24 hours.

Figure 2:
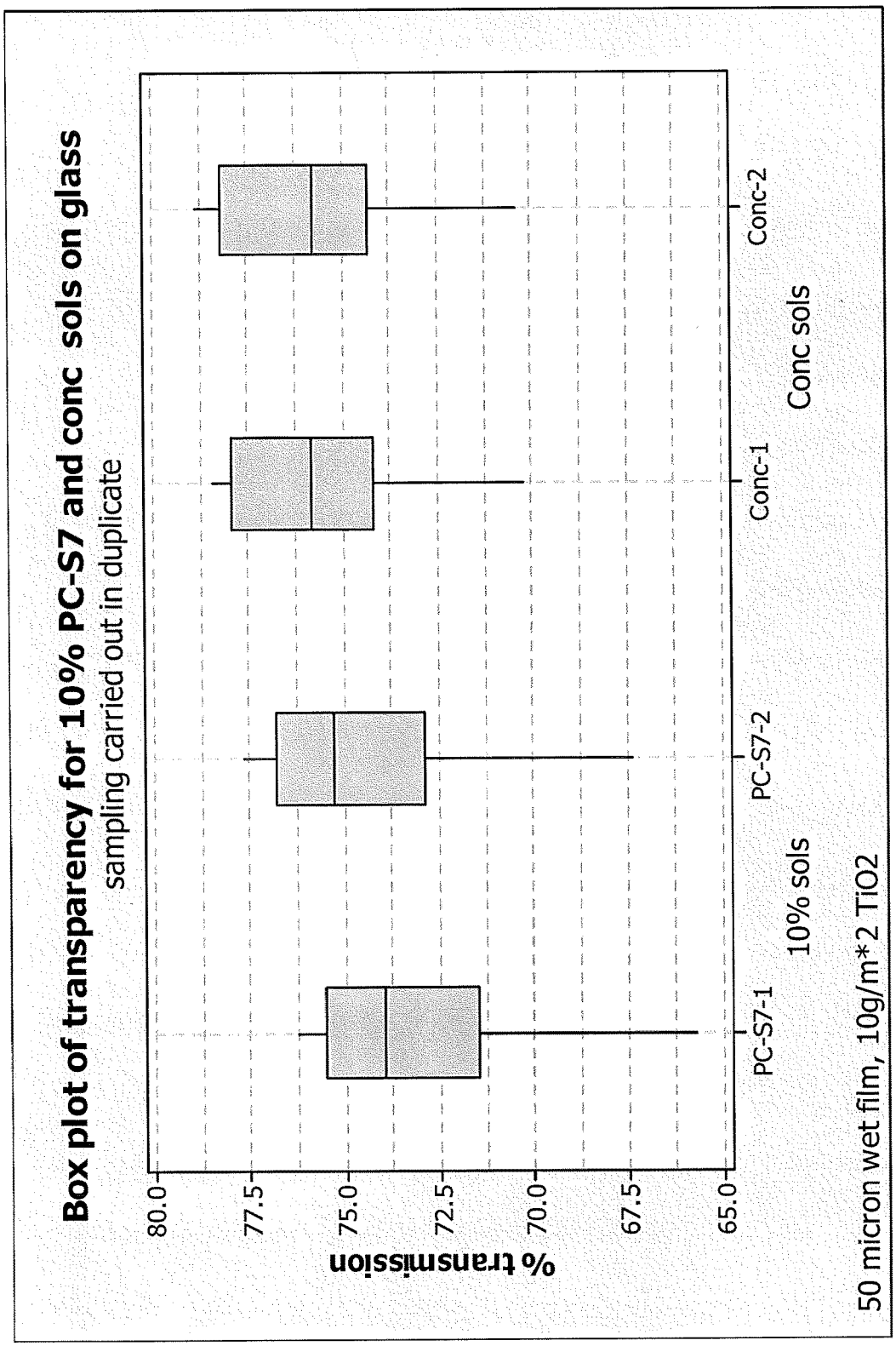
FIG. 2 is a graph showing a boxplot of transparency measured for comparative formulations and formulations prepared according to embodiments of the present disclosure.

Using a Perkin Elmer UV/Vis spectrometer, the percent transmission for every wavelength from 400 to 700 nm was measured for each sample. A box plot of the comparison of the transparency of each dried film is shown in FIG. 2, wherein greater percent transmission indicates greater transparency. In FIG. 2, the horizontal line in each box represents the median percent transmission for each test material. As such, the median percent transmission values were as follows: PC-S7-1 (73.8%); PC-S7-2 (75.1%); Conc. 1 (75.7%); and Conc. 2 (75.8%). As can be seen from these median values, the sols resulting from the concentrated compositions had higher transparency than a conventionally diluted sol. Again, the presence of any increase was surprising since all of the sols used in the test on glass had the same 10% concentration at the time of use.

EXAMPLE 3

Stability

Figure 3:
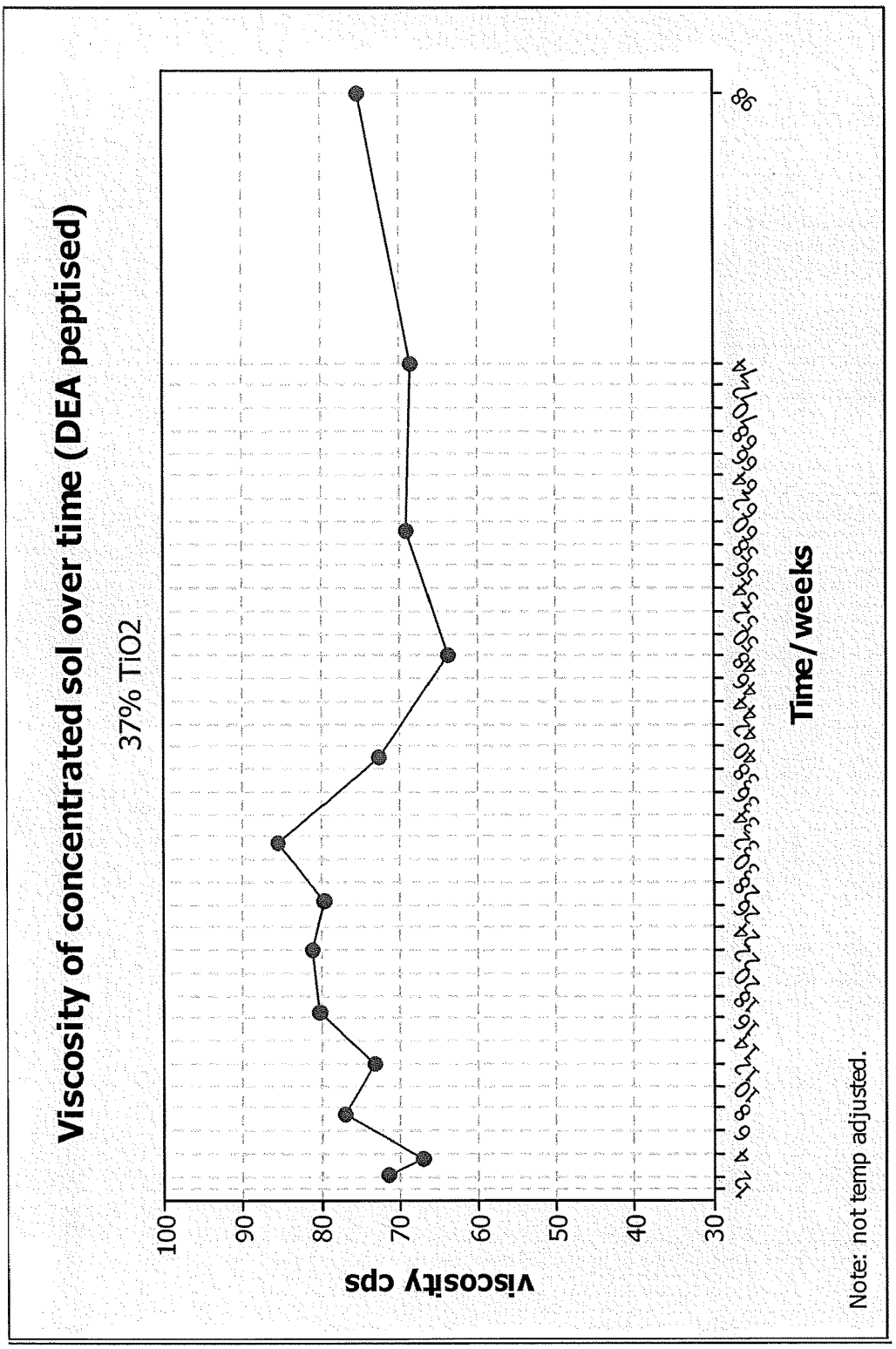
FIG. 3 is a graph showing viscosity over time of a concentrated sol prepared according to embodiments of the present disclosure.

It is more difficult to maintain stability of $TiO_2$ at higher concentrations due to the possibility of agglomeration and breaking down of the colloidal nature of the sol, which manifests itself by an increase in viscosity. Accordingly, as a measure of stability, solution viscosity of the concentrated sol was measured using a Brookfield viscometer. A concentrated sol with a 37% $TiO_2$ concentrate was prepared as described herein. Solution viscosity was tested over 74 weeks, and the viscosity plot is shown in FIG. 3. As seen therein, the viscosity of the concentrated sol after aging for 74 weeks was substantially the same as the viscosity at the beginning of the test. Even at 98 weeks, there was no substantially viscosity increase relative to the start date of the test.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method for preparing a photocatalytic, neutral titanium dioxide sol, the method comprising:
    washing and dewatering a hydrous titanium dioxide gel with an aqueous solvent having a cation concentration of about 500 ppm or less until achieving a filtrate conductivity of about 750 0 μS/cm or less and forming a titanium dioxide filter cake;
    peptizing the titanium dioxide filter cake by adding the filter cake to an alkaline peptizing agent to provide a peptized alkaline titanium dioxide sol with a $TiO_2$ concentration of about 35% by weight or greater;
    neutralizing the peptized alkaline titanium dioxide sol with a concentrated acid to provide a photocatalytic, neutral titanium dioxide sol with a pH of about 7 to about 9 and a $TiO_2$ concentration of about 30% by weight or greater.

2. The method according to claim 1, wherein the washing and dewatering comprises processing the hydrous titanium dioxide gel in a filter press.

3. The method according to claim 1, wherein the aqueous solvent is demineralized water.

4. The method according to claim 1, wherein the aqueous solvent has a cation concentration of about 100 ppm or less.

5. The method according to claim 1, wherein the aqueous solvent has a $Ca^{2+}$ concentration of about 50 ppm or less.

6. The method according to claim 1, wherein the washing and dewatering is carried out until achieving a filtrate conductivity of about 600 0 μS/cm or less.

7. The method according to claim 1, wherein the alkaline peptizing agent is selected from the group consisting of an alkylamine, a quaternary ammonium hydroxide, and combinations thereof.

8. The method according to claim 7, wherein the alkaline peptizing agent is selected from the group consisting of diethylamine (DEA), tetraethyl ammonium hydroxide (TEAOH), and combinations thereof.

9. The method according to claim 1, wherein the titanium dioxide filter cake is added under mixing.

10. The method according to claim 9, wherein peptizing is substantially completed in a time of about 90 minutes or less.

11. The method according to claim 1, wherein the peptized alkaline titanium dioxide sol has a $TiO_2$ concentration of about 40% by weight or greater.

12. The method according to claim 1, wherein the peptized alkaline titanium dioxide sol has a pH of about 11 or greater.

13. The method according to claim 1, wherein the concentrated acid comprises phosphoric acid.

14. The method according to claim 13, wherein the phosphoric acid has a concentration of about 75% w/w or greater.

15. The method according to claim 1, wherein the neutralizing is carried out in a time of about 120 minutes or less.

16. The method according to claim 1, wherein the neutral titanium dioxide sol has a pH of about 8 to about 9 and a $TiO_2$ concentration of about 35% by weight or greater.

17. The method according to claim 1, wherein the $TiO_2$ particles in the neutral titanium dioxide sol have an average size of about 50 nm or less.

18. The method according to claim 1, wherein about 90% or greater of the $TiO_2$ particles in the neutral titanium dioxide sol are in the anatase form.

19. The method according to claim 1, wherein the neutral titanium dioxide sol has a viscosity of about 40 centipoise to about 100 centipoise.

20. A method for preparing a photocatalytic, neutral titanium dioxide sol, the method comprising:
processing a hydrous titanium dioxide gel in a filter press with demineralized water having a $Ca^{2+}$ concentration of about 50 ppm or less until achieving a filtrate conductivity of about 500 0 μS/cm or less and forming a titanium dioxide filter cake;
peptizing the titanium dioxide filter cake by adding the filter cake to an alkaline peptizing agent with mixing to provide a peptized alkaline titanium dioxide sol with a $TiO_2$ concentration of about 35% by weight or greater, said peptizing being substantially completed in a time of about 60 minutes or less;
neutralizing the peptized alkaline titanium dioxide sol with phosphoric acid at a concentration of about 85% w/w or greater to provide a photocatalytic, neutral titanium dioxide sol with a pH of about 8 to about 9 and a $TiO_2$ concentration of about 35% by weight or greater.

21. The method of claim 1, wherein the concentrated acid comprises phosphoric acid having a concentration of about 85% w/w or greater.

22. The method of claim 1, further comprising, after the step of neutralizing the peptized alkaline titanium dioxide sol with a concentrated acid to provide a photocatalytic, neutral titanium dioxide sol with a pH of about 7 to about 9 and a $TiO_2$ concentration of about 30% by weight or greater, diluting said photocatalytic, neutral titanium dioxide sol with deionized water to provide a solution with a $TiO_2$ concentration of approximately 10% by weight based upon the total weight of said sol.

23. The method of claim 20, further comprising, after the step of neutralizing the peptized alkaline titanium dioxide sol with phosphoric acid at a concentration of about 85% w/w or greater to provide a photocatalytic, neutral titanium dioxide sol with a pH of about 8 to about 9 and a $TiO_2$ concentration of about 35% by weight or greater, diluting said photocatalytic, neutral titanium dioxide sol with deionized water to provide a solution with a $TiO_2$ concentration of approximately 10% by weight based upon the total weight of said sol.

24. A method for preparing a photocatalytic, neutral titanium dioxide sol, the method comprising:
washing and dewatering a hydrous titanium dioxide gel with an aqueous solvent having a cation concentration of about 500 ppm or less until achieving a filtrate conductivity of about 750 μS/cm or less and forming a titanium dioxide filter cake;
peptizing the titanium dioxide filter cake by adding the filter cake to an alkaline peptizing agent to provide a peptized alkaline titanium dioxide sol with a $TiO_2$ concentration of about 35% by weight or greater;
neutralizing the peptized alkaline titanium dioxide sol with a concentrated acid, wherein said concentrated acid comprises phosphoric acid having a concentration of about 85% w/w or greater, to provide a photocatalytic, neutral titanium dioxide sol with a pH of about 7 to about 9 and a $TiO_2$ concentration of about 30% by weight or greater;
diluting said photocatalytic, neutral titanium dioxide sol with deionized water to provide a solution with a $TiO_2$ concentration of approximately 10% by weight based upon the total weight of said sol.

* * * * *